(12) United States Patent
Fujioka (10) Patent No.: US 12,528,205 B2
(45) Date of Patent: Jan. 20, 2026

(54) WRIST DEVICE AND JOINT DEVICE (71) Applicant: FANUC CORPORATION, Yamanashi (JP)

(72) Inventor: Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/838,607

(22) PCT Filed: Mar. 4, 2022

(86) PCT No.: PCT/JP2022/009556
§ 371 (c)(1),
(2) Date: Aug. 15, 2024

(87) PCT Pub. No.: WO2023/166739
PCT Pub. Date: Sep. 7, 2023

(65) Prior Publication Data
US 2025/0153369 A1    May 15, 2025

(51) Int. Cl.
*B25J 17/02* (2006.01)
*B25J 15/04* (2006.01)

(52) U.S. Cl.
CPC ............. *B25J 15/045* (2013.01); *B25J 17/02* (2013.01)

(58) Field of Classification Search
CPC ................ B25J 15/0408; B25J 15/0405; B25J 15/0616; B25J 19/0033; B25J 19/0041
See application file for complete search history.

(56) References Cited

U.S. PATENT DOCUMENTS 11,458,642 B2 * 10/2022 Takahashi ............ B25J 19/0033
12,208,518 B2 * 1/2025 Kastler .................... B25J 17/00

FOREIGN PATENT DOCUMENTS

| JP | H01-257592 A | | 10/1989 |
| JP | H11-277478 A | | 10/1999 |
| JP | 2004090152 A | * | 3/2004 |
| JP | 2005-508762 A | | 4/2005 |
| JP | 2012-096332 A | | 5/2012 |
| JP | 2019-014028 A | | 1/2019 |
| WO | 2010010598 A1 | | 1/2010 |

* cited by examiner

*Primary Examiner* — Gregory Robert Weber
(74) *Attorney, Agent, or Firm* — HAUPTMAN HAM, LLP (57) ABSTRACT

A wrist device according to one aspect of the present disclosure is mounted on a distal end of a robot arm. The wrist device is provided with a flange including a mounting plate for mounting an external device and a base for rotatably supporting the flange. In the mounting plate, a hole for connecting a tube joint disposed outside the wrist device and a tube joint disposed inside the wrist device is formed.

6 Claims, 7 Drawing Sheets

Fig. 7

WRIST DEVICE AND JOINT DEVICE

RELATED APPLICATIONS

The present application is a National Phase of International Application No. PCT/JP2022/009556 filed Mar. 4, 2022.

TECHNICAL FIELD

This disclosure relates generally to a wrist device and a joint device.

BACKGROUND ART

Various types of end effectors are attached to the distal end of the robot arm depending on the application. For example, some end effectors are operated by controlling the supply of electrical power and some are operated by controlling the supply of compressed air. Thus, many end effectors are connected to linear bodies such as electrical cables and air tubes. The routing of these linear bodies is an important technical development element from various perspectives, such as ensuring safety and aesthetics. For example, Patent Literature 1 discloses a technique directed to routing of linear bodies (electrical cables) which can reduce interference with peripheral devices.

Since electrical cables are relatively easy to bend, they have a high degree of freedom in routing and can be easily routed inside the robot arm mechanism. In contrast, linear bodies such as air tubes are difficult to bend or, if excessively bent, are blocked so that their air distribution function deteriorates; therefore, they have a low degree of freedom in routing, and are often routed from the base of the robot arm mechanism to the end effector mounted on the distal end of the robot arm mechanism while being gently bent along the outer peripheral surface of the robot arm mechanism. Routing the linear bodies along the outer peripheral surface of the robot arm mechanism significantly changes the appearance and increases the risk of the linear bodies coming into contact with peripheral members and the like.

CITATION LIST

Patent Literature

Patent Literature 1: Japanese Unexamined Patent Application Publication No. 2012-96332

DETAILED DESCRIPTION OF THE INVENTION

A wrist device according to one aspect of the present disclosure is mounted on a distal end of a robot arm. The wrist device is provided with a flange including a mounting plate for mounting an external device and a base for rotatably supporting the flange. In the mounting plate, a hole for connecting a first tube joint disposed outside the wrist device and a second tube joint disposed inside the wrist device is formed.

Hereinafter, a wrist device according to the present embodiment will be described with reference to the drawings. In the following description, constituent elements having substantially the same function and configuration are denoted by the same reference numeral, and repetitive descriptions will be given only where necessary.

Figure 1:
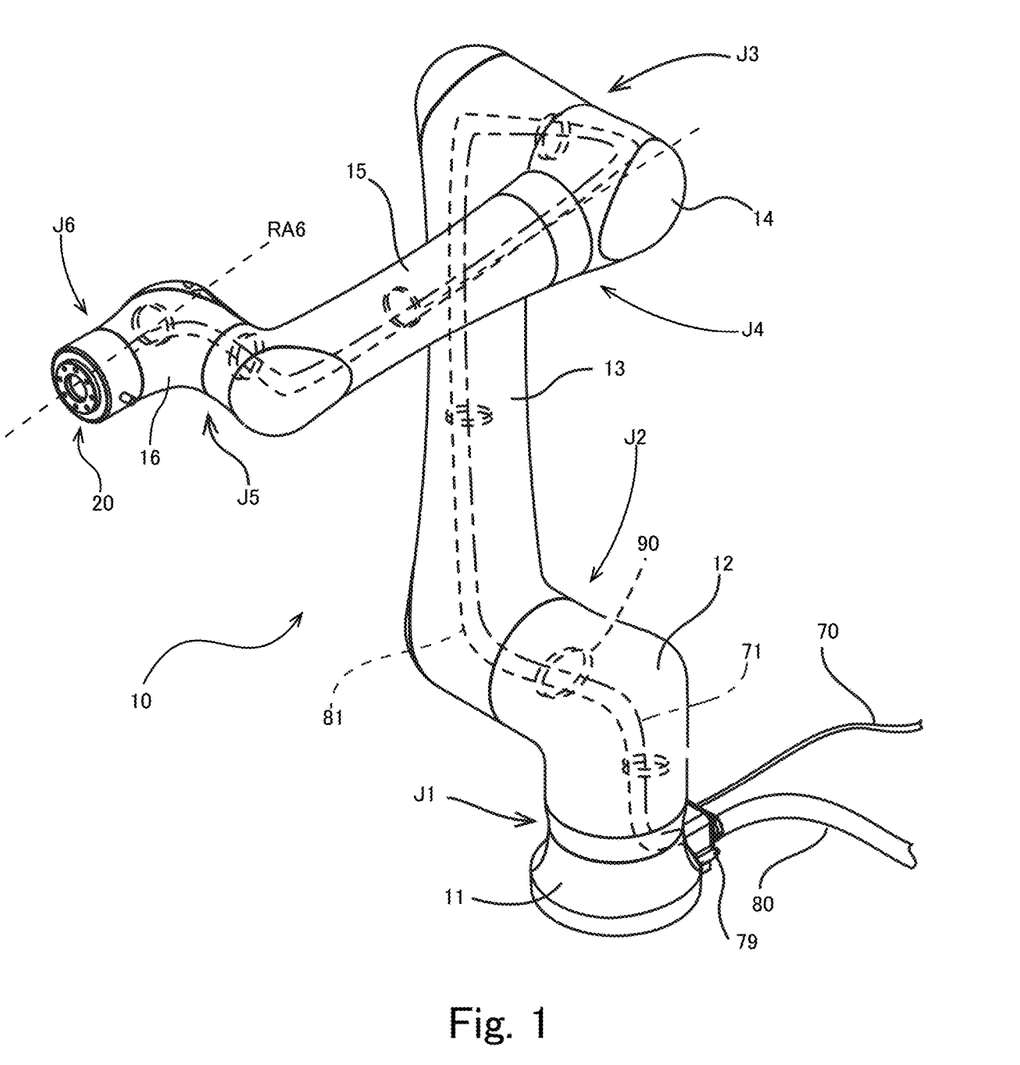
FIG. 1 is a perspective view showing an example of a robot arm mechanism equipped with a wrist device according to the present embodiment.

As shown in FIG. 1, a wrist part 20 according to the present embodiment (hereinafter referred to as a wrist device) is a device mounted on the distal end of the robot arm mechanism 10. The wrist device 20 is configured to realize a function of connecting an external device such as an end effector and rotating the external device around one or a plurality of axes, and a function of connecting a tube joint 52 (see FIG. 5) connected to an air tube 81 arranged inside the wrist device 20 and a tube joint 51 (see FIG. 5) connected to an air tube 82 (see FIG. 5) arranged outside the wrist device 20.

A base part 11 is installed on a ground surface such as a floor surface. A plurality of links 12-15 are connected to a plurality of joints J1-J6. The wrist device 20 includes, for example, the joint part J6. The wrist device 20 may be configured to include the joint parts J4-J6. Here, the former case will be described. An external device (not shown) such as an end effector is connected to the wrist device 20.

As shown in FIG. 1, the base part 11 is provided with a connector 79 for connecting an air tube 80 extending from an external air compressor and an electric cable 70 extending from an external control device. From the base part 11 to the wrist device 20 of the robot arm mechanism 10, the air tube 81 and the electric cable 71 are bound together by a clamp member 90 or the like, and are routed inside the arm. The robot arm mechanism 10 includes a plurality of drive mechanisms (not shown) that drive the plurality of joint parts J1-J6, respectively. The drive mechanism includes a servo motor and a reduction gear that reduces the rotation of the servo motor.

Figure 2:
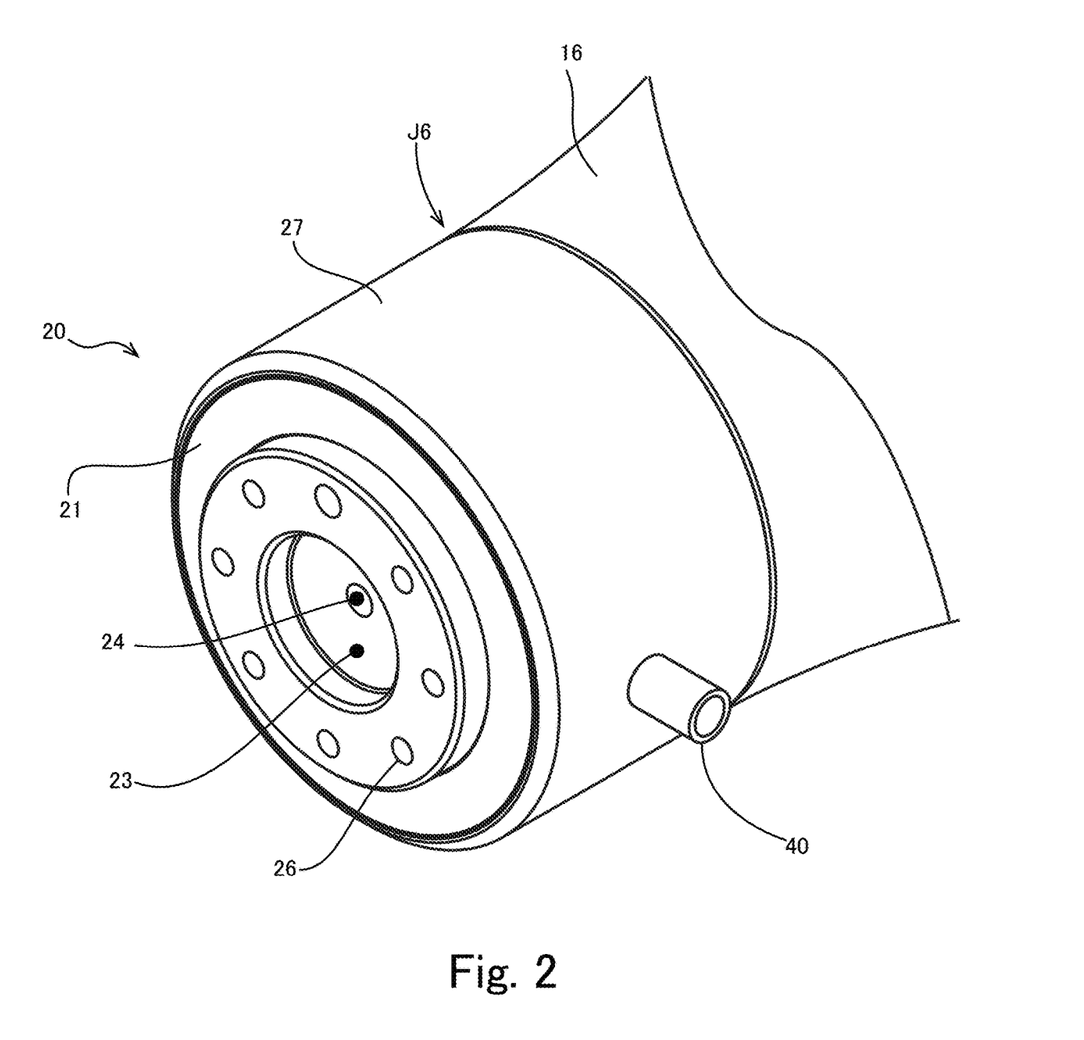
FIG. 2 is an enlarged view of the wrist device shown in FIG. 1.
Figure 3:
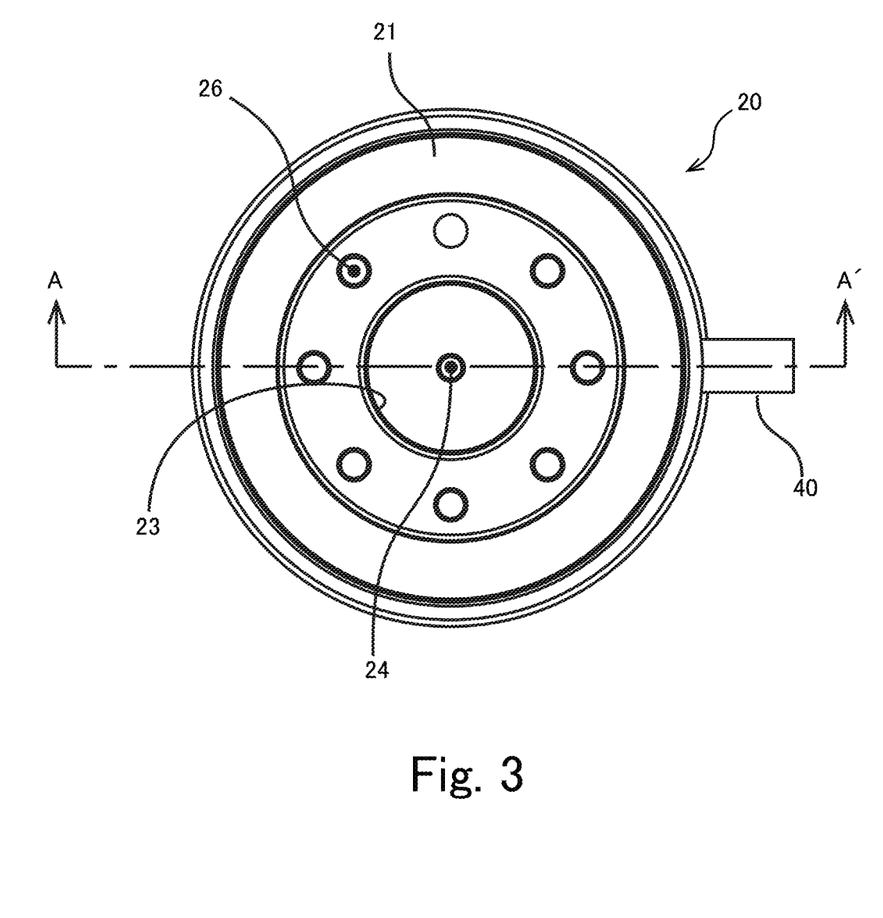
FIG. 3 is a front view of the wrist device shown in FIG. 2.
Figure 4:
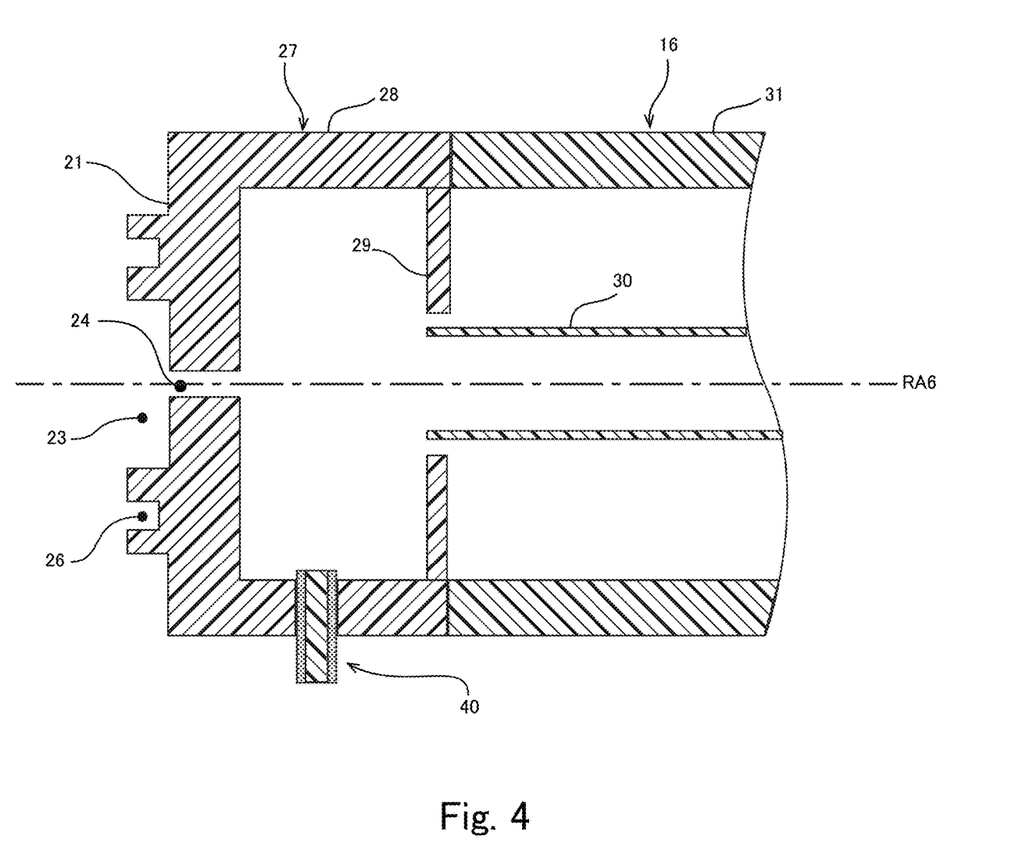
FIG. 4 is an end view taken along line A-A' in FIG. 3

The wrist device 20 will be described below with reference to FIG. 2, FIG. 3, and FIG. 4. The wrist device 20 includes a flange 27 serving as a rotary portion and a base 16 serving as a fixed portion that rotatably supports the flange 27. The flange 27 has a short cylindrical body 28. A mounting plate 21 for mounting an external device such as an end effector is connected to the front end of the short cylindrical body 28. A rotary plate 29 is connected to the rear end of the short cylindrical body 28. The rotary plate 29 is connected to a hollow cylindrical rotation shaft 30 supported by a frame 31 of the base 16. An air tube or an electric cable is inserted through the cylindrical rotation shaft 30.

The mounting plate 21 has a disc shape, and the center thereof is positioned on a sixth center line of rotation RA6 and is oriented orthogonally to the sixth center line of rotation RA6. A connector 40 for connecting an electric cable 71 arranged inside the wrist device 20 and an electric cable (not shown) arranged outside the wrist device 20 is oriented outwardly on the outer side surface of the short cylindrical body 28 of the flange 27. The rotation shaft 30 is connected to a drive mechanism (not shown) via a transmission mechanism composed of a gear, a belt, and the like. When the drive mechanism is driven, the mounting plate 21 is rotated around the sixth center line of rotation RA6 together with the flange 27 as the rotation shaft 30 is driven to rotate.

The mounting plate 21 is provided with a spigot joint portion 23 into which a joint portion (part) of an external device is fitted. Typically, the spigot joint portion 23 is provided as a recess provided in a central portion of the surface of the mounting plate 21. A plurality of bolt holes 26 are formed around the mounting plate 21 inside the spigot joint portion 23. An external device can be mounted on the mounting plate 21 by screwing bolts into the bolt holes 26.

Figure 5:
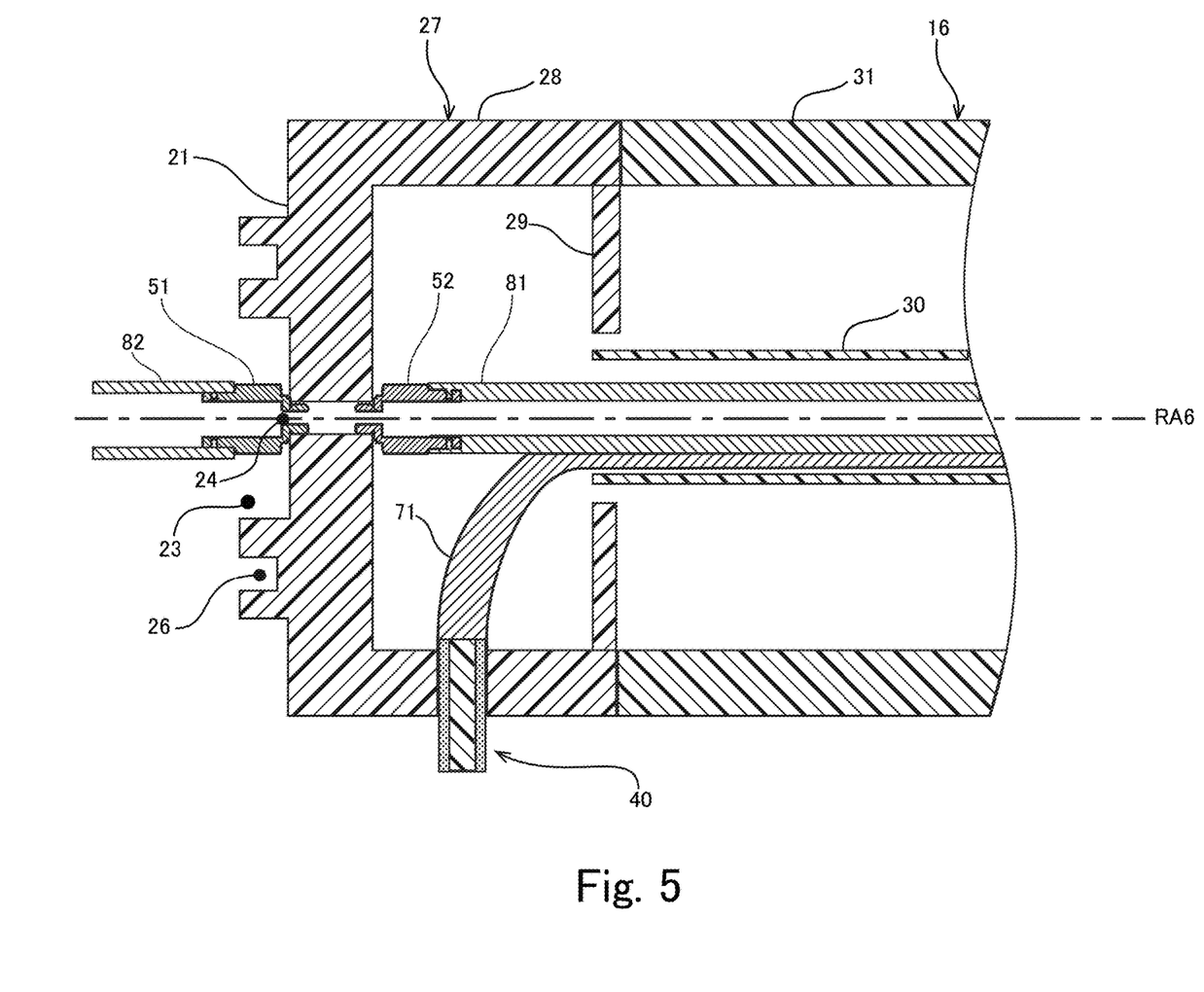
FIG. 5 is an end view showing a state in which tube joints are screwed into a connection hole.

As shown in FIG. 5, a hole (connection hole) 24 for connecting a tube joint (first tube joint) 51 disposed outside the wrist device 20 and a tube joint (second tube joint) 52 disposed inside the wrist device 20 is formed in the mounting plate 21. The connection hole 24 is composed of a hole portion formed in the mounting plate 21 itself. The center of the connection hole 24 is positioned on the center line of rotation RA6, and the center line thereof is parallel to the center line of rotation RA6. The connection hole 24 is configured such that the tube joints 51 and 52 respectively connected to the air tubes 82 and 81 can be detachably connected from inside and outside. For example, the connection hole 24 can be configured as a female thread, and the two tube joints 51 and 52 can be screwed into the connection hole 24 from both inside and outside respectively. Note that a seal washer or a seal ring is fitted in the inner tube joint 52, or a seal member is attached thereto, so as to provide a sealing measure for isolating the inside of the wrist device 20, the inside of the arm, and the inside of the robot from the outside air.

Figure 6:
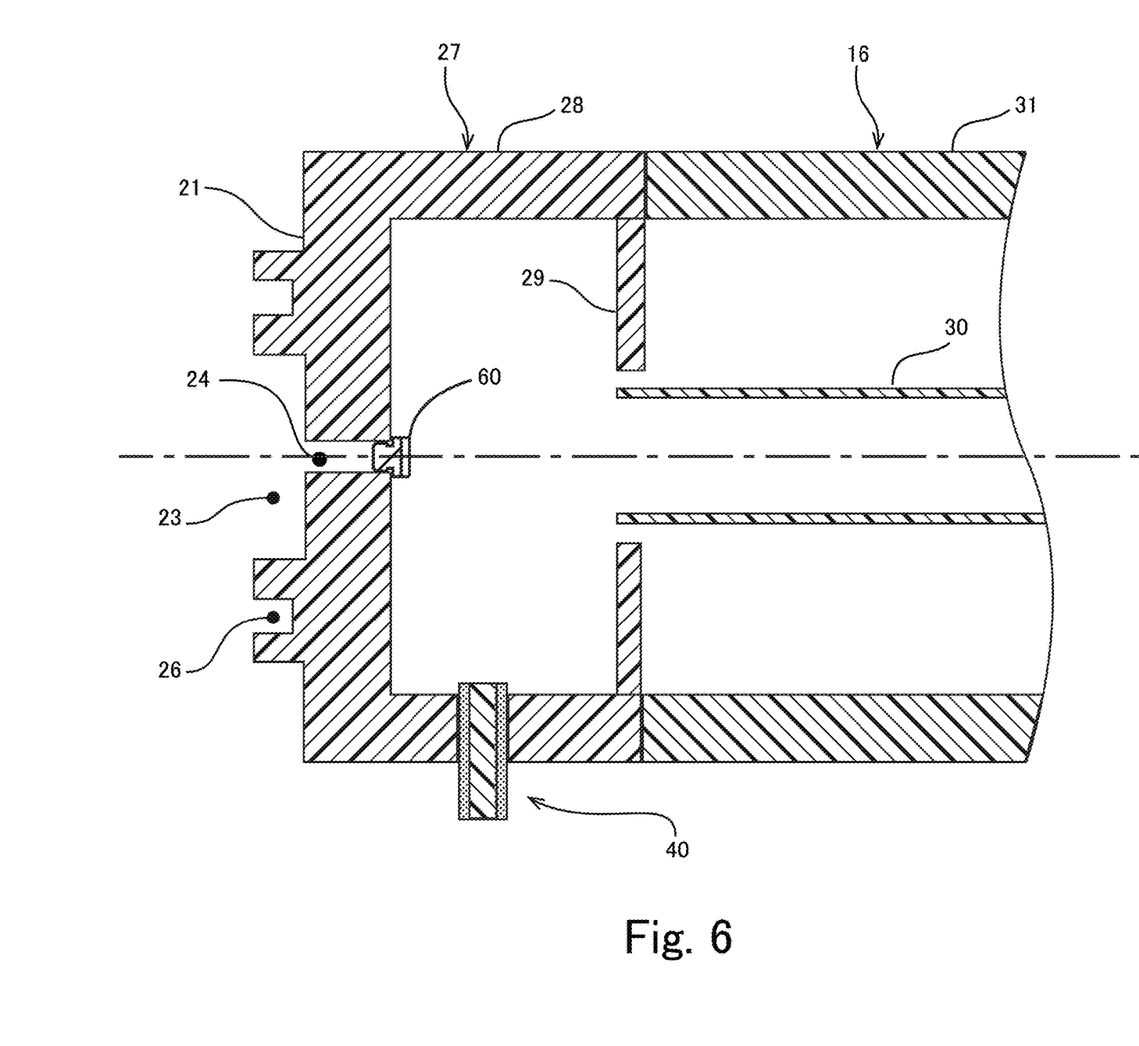
FIG. 6 is an end view showing a state in which a plug member is screwed into the connection hole.

Effects of the wrist device 20 according to the present embodiment will be described below with reference to FIG. 5 and FIG. 6.

In the wrist device 20 according to the present embodiment, the connection hole 24 for connecting the tube joint 51 disposed outside the wrist device to the tube joint 52 disposed inside the wrist device is provided in the mounting plate 21 of the flange 27. The air tube 81 arranged along the center line of rotation RA6 through the inside of the robot arm mechanism 10 to the inside of the wrist device 20 can be straightened without changing its orientation. Accordingly, the air tube 81 can be prevented from being blocked due to bending or the like. Furthermore, in the conventional structure in which the connection hole is provided in the side surface of the wrist device 20, a space for storing the air tube 81 curved at an almost right angle is required, and a larger space is required to prevent interference with the movement of the air tube 81 caused by the rotation of the flange 27. Since the air tube 81 can be arranged in a straight line, the space can be made narrower. This contributes to reduction in size of the wrist device.

The connection hole 24 of the mounting plate 21 of the flange 27 is not merely a hole for allowing the air tube 81 to pass therethrough, but has a function of connecting the inner and outer tube joints 51 and 52. When the end effector is mounted on the mounting plate 21, it is necessary to have the air tube from the end effector communicate with the inner air tube 81, but this task can be completed by simply screwing the tube joint 51 connected to the air tube from the end effector into the connection hole 24.

That is, since the connection hole 24 is configured as a female thread, when the air tube 81 is used, simply screwing the outer tube joint 51 into the connection hole 24 and screwing the inner tube joint 52 into the connection hole 24 as shown in FIG. 5 completes the preparation for having the inner and outer air tubes 81 and 82 communicate with each other. When the preparation is completed, the air tube 81 arranged inside the wrist device 20 is connected to the tube joint 52, and the air tube 82 arranged outside the wrist device 20 is connected to the tube joint 51. This allows the inner and outer air tubes 81 and 82 to communicate with each other.

Since the connection hole 24 is configured as a female thread, the tube joints 51 and 52 can be attached to and detached from the connection hole 24. When the air tubes are not used, the tube joints 51 and 52 are removed from the connection hole 24, and the plug member 60 for closing the connection hole 24 can be screwed into the connection hole 24 from inside as shown in FIG. 6. A seal washer or a seal ring is fitted into the plug member 60, or a seal member is attached thereto as in the case of the inner tube joint 52, so as to provide a sealing measure. This prevents dust from entering the inside of the wrist device 20 through the connection hole 24 even in applications where the air tubes are not used. Moreover, since the plug member 60 can be fastened from inside of the connection hole 24, the plug member 60 does not protrude into the spigot joint portion 23 and does not interfere with the joint portion of the external device which is fitted into the spigot joint portion 23. As described above, the wrist device 20 according to the present embodiment can be used for both applications in which the air tubes are used and applications in which the air tubes are not used by simply changing the part screwed into the connection hole 24.

Further, by providing the connection hole 24 on the distal end side of the wrist device 20 on which the external device is mounted, the possibility of the air tube coming into contact with the peripheral members of the robot arm mechanism 10 can be reduced as compared with a configuration in which the air tube 81 is drawn out from the side surface of the wrist device 20 or a configuration in which the connection hole 24 for the air tube is provided in the side surface of the wrist device 20.

The connection hole 24 of the wrist device 20 according to the present embodiment connects the air tubes arranged inside and outside the wrist device 20 to each other, and functions as a tube for passing a fluid such as compressed air. Therefore, the connection hole 24 should be inherently distinguished in its function and structure from a passage hole that is only for passing an air tube arranged inside the wrist device 20 to the outside of the wrist device 20.

In the present embodiment, the wrist device 20 connected to the distal end of the robot arm mechanism 10 is described as an example. However, the structure for connecting the tube joints of the air tubes provided in the wrist device 20 according to the present embodiment can also be applied to the joint parts (joint devices) J1, J2, and J3. The joint parts (joint devices) J1, J2, and J3 constitute the robot arm together with a plurality of links.

Figure 7:
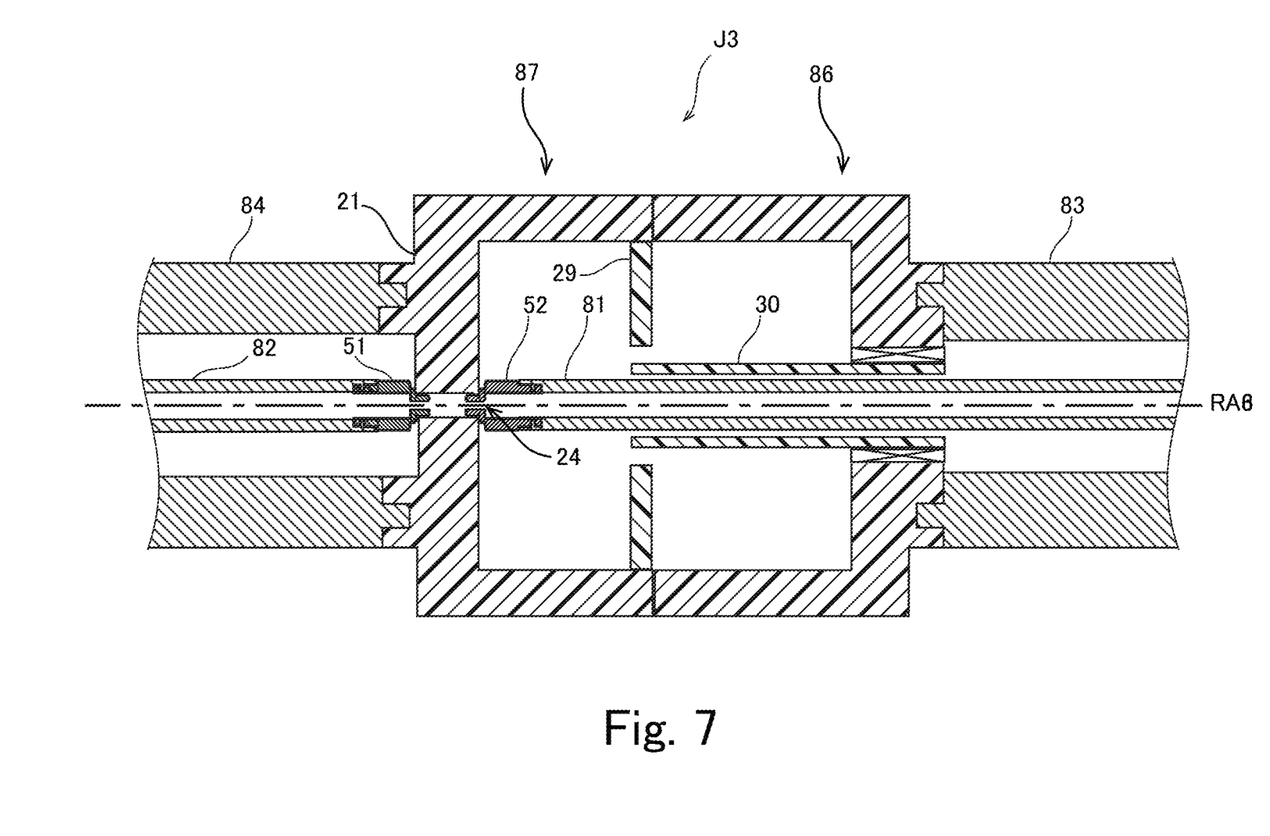
FIG. 7 is an end view showing a joint device according to a modification of the present embodiment.

FIG. 7 shows an example in which the connection structure is applied to the third joint part J3. The third joint part J3 includes a fixed portion 86 connected to the link 83 on the joint part J2 side and a rotary portion 87 connected to the link 84 on the joint part J4 side. A connection hole 24 is formed in the mounting plate 21 of the rotary portion 87 for connecting the link 84. The connection hole 24 is parallel to the center line of rotation RA3 of the mounting plate 21, and is centered on the center line of rotation RA3.

A tube joint 52 connected to an air tube 81 inserted into the link 83 and the hollow cylindrical rotation shaft 30 is screwed into the connection hole 24 from inside, and a tube joint 51 connected to an air tube 82 inserted into the link 84 is screwed into the connection hole 24 from outside. This allows the inner and outer tube joints 51 and 52 to be connected, and the inner and outer air tubes 81 and 82 to communicate with each other.

The structure for connecting the tube joints of the air tubes according to the present embodiment can also be applied to a joint device, and the same effects as described above can be obtained.

In the present embodiment, the connection hole 24 is formed as a tap so that the two tube joints 51 and 52 can be screwed from both inside and outside, but the connection method is not limited to the present embodiment as long as the air tube 81 inside the wrist device 20 and the air tube outside the wrist device 20 can be connected. At least a hole passing through the mounting plate 21 has to be provided in the mounting plate 21 as the connection hole 24. For example, a one-touch connector utilizing a mating structure can be used as the connection method. The one-touch connector is a connector that can connect two parts with a single attachment operation and separate them with a single separation operation. In this case, for example, female connectors may be provided on both sides of the connection hole 24, and male connectors may be provided on the air tubes. When the air tubes are not used, a male plug member may be inserted into the female connector inside the connection hole 24.

In the present embodiment, the connection hole 24 is disposed parallel to the sixth center line of rotation RA6 with the sixth center line of rotation RA6 at the center (the center of the mounting plate 21). This avoids a situation where the air tube 81 moves due to the rotation of the wrist device 20 and the external device attached to the wrist device 20 around the sixth center line of rotation RA6. However, since the connection hole 24 itself also functions as a tube, the position and shape thereof can be freely designed. For example, the end of the connection hole passing through the mounting plate 21, which is located inside the wrist device 20, may be positioned on the sixth center line of rotation RA6, and the end of the connection hole passing through the mounting plate 21, which is located outside the wrist device 20, may be positioned offset to the sixth center line of rotation RA6 in the vertical and horizontal directions. As described above, only by changing the shape and position of the connection hole passing through the mounting plate 21, the degree of freedom of the position for connecting the air tubes arranged inside and outside the wrist device 20 can be improved. This is an effect that can be achieved because the connection hole 24 also functions as a tube, and in the configuration in which the air tube arranged inside the wrist device 20 is drawn out of the wrist device 20 through a hole provided in the wrist device 20, the air tube itself must be bent, so that it is difficult to change the position and orientation of the air tube in the same space as in the present embodiment.

In the present embodiment, the spigot joint portion 23 is provided as a recess in the central portion of the surface of the mounting plate 21; however, the configuration of the spigot joint portion 23 is not limited to this as long as the position of the external device can be adjusted. The spigot joint portion 23 can be appropriately designed in accordance with the shape of the position adjustment portion of the external device mounted on the wrist device 20. Of course, the mounting plate 21 does not have to have the spigot joint portion 23.

In the present embodiment, bolts are employed as a method for detachably fixing the external device to the mounting plate 21, and the mounting plate 21 is provided with bolt holes 26 for inserting bolts. However, as long as the external device can be fixed to the mounting plate 21, the fixing method is not limited to the present embodiment, and the mounting plate 21 may be configured to have a structure corresponding to the fixing method. Of course, as long as the external device can be fixed to the rotary portion of the wrist device 20, the structure for fixing the external device may be provided by another structure, such as the flange 27, which constitutes the rotary portion of the wrist device 20.

Although several embodiments of the present invention have been described, these embodiments are presented by way of example and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A wrist device mounted on a distal end of a robot arm, the wrist device comprising:
   a cylindrical body including a disk-shaped mounting plate connected to a front end thereof, the disk-shaped mounting plate configured to mount an external device and having a hole formed at a center of the disk-shaped mounting plate;
   a base configured to rotatably support the cylindrical body about a central axis thereof; and
   a first tube joint and a second tube joint disposed in front of and behind the hole, respectively, each of the first tube joint and the second tube joint having a cylindrical shape, wherein
   a central axis of the hole, the first tube joint, and the second tube joint are aligned with the central axis of the cylindrical body;
   an air tube is connected to each of the first tube joint and the second tube joint; and
   an electrical connector configured to be connected to an electric cable is disposed on a peripheral side wall of the cylindrical body.

2. The wrist device according to claim 1, wherein the hole is configured as a female thread for attaching and detaching the first and second tube joints.

3. The wrist device according to claim 2, further comprising:
   a plug member to be screwed into the hole from inside to close the hole.

4. The wrist device according to claim 1, wherein the disk-shaped mounting plate is provided with a spigot joint portion into which a part of the external device is to be fitted from outside.

5. A robot arm mechanism, comprising:
   a robot arm; and
   a wrist device mounted on a distal end of the robot arm, wherein
   the wrist device comprises:
   a cylindrical body including a disk-shaped mounting plate connected to a front end thereof, the disk-shaped mounting plate configured to mount an external device and having a hole formed at a center of the disk-shaped mounting plate,
   a base configured to rotatably support the cylindrical body about a central axis thereof, and a first tube joint and a second tube joint disposed in front of and behind the hole, respectively, each of the first tube joint and the second tube joint having a cylindrical shape, a central axis of the hole, the first tube joint, and the second tube joint are aligned with the central axis of the cylindrical body;

an air tube is connected to each of the first tube joint and the second tube joint; and an electrical connector configured to be connected to an electric cable is disposed on a peripheral side wall of the cylindrical body.

6. A joint device configured to constitute a robot arm together with a link, the joint device comprising:

a rotary portion; and a fixed portion for rotatably supporting the rotary portion, wherein the rotary portion comprises:

a cylindrical body including a disk-shaped connection plate connected to a front end thereof, the disk-shaped connection plate configured to mount the link and having a hole formed at a center of the disk-shaped connection plate, a base configured to rotatably support the cylindrical body about a central axis thereof; and a first tube joint and a second tube joint disposed in front of and behind the hole, respectively, each of the first tube joint and the second tube joint having a cylindrical shape, a central axis of the hole, the first tube joint, and the second tube joint are aligned with the central axis of the cylindrical body;

an air tube is connected to each of the first tube joint and the second tube joint; and an electrical connector configured to be connected to an electric cable is disposed on a peripheral side wall of the cylindrical body.

* * * * *